(12) United States Patent
Satou et al.

(10) Patent No.: US 8,802,986 B2
(45) Date of Patent: Aug. 12, 2014

(54) WIRE HARNESS INSTALLATION STRUCTURE

(75) Inventors: Kunihiko Satou, Kosai (JP); Atsuyoshi Yamaguchi, Kosai (JP)

(73) Assignee: Yazaki Corporation, Tokyo (JP)

( * ) Notice: Subject to any disclaimer, the term of this patent is extended or adjusted under 35 U.S.C. 154(b) by 144 days.

(21) Appl. No.: 13/147,604

(22) PCT Filed: Feb. 4, 2010

(86) PCT No.: PCT/JP2010/051641
§ 371 (c)(1),
(2), (4) Date: Aug. 3, 2011

(87) PCT Pub. No.: WO2010/098189
PCT Pub. Date: Sep. 2, 2010

(65) Prior Publication Data
US 2011/0290557 A1    Dec. 1, 2011

(30) Foreign Application Priority Data
Feb. 25, 2009   (JP) ................. 2009-042307

(51) Int. Cl.
*H02G 3/04* (2006.01)
*H01B 7/06* (2006.01)
*H02G 3/00* (2006.01)

(52) U.S. Cl.
USPC .......... 174/72 A; 174/68.1; 174/69; 174/70 R

(58) Field of Classification Search
USPC ............... 174/70 R, 72 A, 68.1, 69, 74 R
See application file for complete search history.

(56) References Cited

U.S. PATENT DOCUMENTS 5,957,702 A    9/1999  Nagai et al.
6,161,894 A *  12/2000 Chapman .................. 296/155

(Continued)

FOREIGN PATENT DOCUMENTS

EP    0 855 312 A2    7/1998
JP    2001-359232 A   12/2001

(Continued)

OTHER PUBLICATIONS

International Search Report issued on Mar. 16, 2010 in International application No. PCT/JP2010/051641.

(Continued)

*Primary Examiner* — Jeremy C Norris
*Assistant Examiner* — Sherman Ng
(74) *Attorney, Agent, or Firm* — Sughrue Mion, PLLC

(57) ABSTRACT

A purpose of the invention is to improve a bending durability of a slip-like plate spring arranged along a wire harness by preventing the slip-like plate spring from being corroded, and to provide a wire harness installation structure in which a conductor in electric wires is not liable to be broken. The wire harness installation structure includes the electric wires 19 that have one ends electrically connected to an electric component provided on a stationary-side structural body and the other ends electrically connected to an electric component provided on a movable-side structural body, the slip-like plate spring 17 that is made of metal and has one end fixed to the stationary-side structural body and the other end fixed to the movable-side structural body, and a binding member 21 that is adapted to bind the electric wires 19 to the slip-like plate spring 17. In the wire harness installation structure, the electric wires 19 are bound by the binding member 21 to the slip-like plate spring 17 at a portion other than a portion of the slip-like plate spring 17 to which an extremely large load is applied when the slip-type plate spring 17 is bent and deformed in accordance with the movement of the movable structural body.

6 Claims, 3 Drawing Sheets

(56) References Cited

U.S. PATENT DOCUMENTS

| | | | |
|---|---|---|---|
| 6,217,375 | B1 | 4/2001 | Nagai et al. |
| 6,417,451 | B1* | 7/2002 | Uchiyama ............... 174/72 A |
| 6,492,592 | B1* | 12/2002 | Murofushi et al. ......... 174/72 A |
| 7,363,750 | B2* | 4/2008 | Seksaria et al. ............ 49/502 |
| 2001/0004022 | A1* | 6/2001 | Kobayashi ............... 174/72 A |
| 2001/0052203 | A1 | 12/2001 | Doshita et al. |
| 2005/0148212 | A1* | 7/2005 | Ojima et al. ............... 439/34 |
| 2006/0131048 | A1* | 6/2006 | Kogure et al. ............. 174/72 A |
| 2006/0278423 | A1* | 12/2006 | Ichikawa et al. .......... 174/72 A |
| 2007/0107926 | A1* | 5/2007 | Nishijima et al. .......... 174/72 A |
| 2007/0148994 | A1* | 6/2007 | Sato et al. ............... 439/34 |
| 2008/0142260 | A1* | 6/2008 | Yamaguchi ............... 174/72 A |

FOREIGN PATENT DOCUMENTS

| | | |
|---|---|---|
| JP | 2002-017031 A | 1/2002 |
| JP | 2002-315168 A | 10/2002 |
| JP | 2005124265 A | 5/2005 |
| JP | 2007-151316 A | 6/2007 |
| JP | 2007-209120 A | 8/2007 |
| JP | 2008-62890 A | 3/2008 |

OTHER PUBLICATIONS

Extended European Search Report, dated Jul. 3, 2012, issued by the European Patent Office in counterpart European Application No. 10746070.1.

Office Action dated May 2, 2013 issued by the State Intellectual Property Office of P.R. China in corresponding Chinese Application No. 201080009415.5.

Office Action dated Sep. 3, 2013 issued by the Japanese Patent Office in counterpart Japanese Application No. 200942307.

Office Action, dated Dec. 18, 2013, issued by the State Intellectual Property Office of P.R. China in counterpart Chinese Patent Application No. 201080009415.5.

Office Action dated Jun. 9, 2014 issued by the State Intellectual Property Office of the People's Republic of China in counterpart Chinese Patent Application No. 201080009415.5.

* cited by examiner

WIRE HARNESS INSTALLATION STRUCTURE

TECHNICAL FIELD

The present invention relates to a wire harness installation structure in which a wire harness is installed so as to bridge over a stationary structural body and a movable structural body so as to supply electric power to an electric component or the like provided on the movable structural body such as, for example, a slidable door, a hatchback door or the like of a vehicle, the movable structural body being movably provided at the stationary structural body.

BACKGROUND ART

In a wire harnesses installed in a vehicle, for example, a wire harness for supplying electric power to an electric component or the like provided on a movable structural body such as a slidable door, a hatchback door or the like is installed so as to bridge over a stationary structural body such as a vehicle body frame or the like and a movable structural body, the movable structural body being movably provided on the stationary structural body.

As such a wire harness installation structure, the patent document 1 described below discloses a configuration wherein one end and the other end of a wire harness are respectively fixed to a movable structural body and a stationary structural body and a plate spring is provided along the wire harness so that the wire harness is supported by the plate spring.

In the above configuration, the plate spring and the wire harness are fixed by using a binding member such as an adhesive vinyl tape, a band, a clamp or the like.

RELATED ART DOCUMENTS

Patent Documents

Patent Document 1: JP-A-2001-359232

SUMMARY OF INVENTION

Problems that the Invention is to Solve

However, the wire harness installation structure has problems as described below. While the wire harness is so constituted that electric wires are bound to the plate spring by the binding member such as a vinyl tape, a binding band, or the like and are supported and fixed to the plate spring, water or oil may be undesirably splashed to the installed wire harness. At that time, in a case where the wire harness is fixed to the plate spring by the binding member such as a vinyl tape, a binding band or the like, adhering water or oil may possibly stay in a small space between the binding member and the plate spring so that the plate spring can be corroded. Particularly, in a binding member which always exists at the lowermost portion of a wire harness, water or oil is liable to stay so that the binding member can be easily corroded.

When corrosion occurs at a portion on the plate spring to which a load is particularly concentrated, the plate spring may be possibly broken by a synergetic effects of both the corrosion and the load. If the plate spring is broken, the wire harness is not stably supported. As a result, the problems may arise that the wire harness is not adequately moved so that it may be damaged by contact to a peripheral member and an electric power supplying function is disabled.

In addition, when a binding member such as a vinyl tape, a binding band or the like is wound around a portion on electric wires to which a large load is to be applied, the problems may arise that a bending way of the electric wires becomes instable and an extra load is applied to the electric wires so that a conductor in the electric wires is possibly broken.

A purpose of the invention that relates to solution of the above problems, is to improve bending durability of a slip-like plate spring which is arranged along a wire harness by preventing the slip-like plate spring from being corroded, and to provide a wire harness installation structure in which a conductor in electric wires is not liable to be broken.

Means for Solving the Problems

The purpose of the invention can be achieved by the following configurations.

(1) A wire harness installation structure comprising:
an electric wire that has one end electrically connected to an electric component provided on a stationary structural body and the other end electrically connected to an electric component provided on a movable structural body;
a slip-like plate spring that is made of metal and has one end fixed to the stationary structural body and the other end fixed to the movable structural body; and
a binding member that is adapted to bind the electric wire to the slip-like plate spring,
wherein the electric wire is bound to the slip-like plate spring by the binding member at a portion other than a portion of the slip-like plate spring to which an extremely large load is applied when the slip-like plate spring is deformably bent in accordance with movement of the movable structural body.

(2) The wire harness installation structure according to the above item (1), further comprising:
a stationary-side protector to which one ends of the bound slip-like plate spring and the electric wire bound to each other are fixed, and the stationary-side protector being fixed to the stationary-side structural body; and
a movable-side protector to which the other ends of the slip-like plate spring and the electric wire bound to each other are fixed, and the movable-side protector being fixed to the movable-side structural body.

(3) The wire harness installation structure according to the above item (1) or the above item (2), wherein the slip-like plate spring and the electric wire bound to each other are covered with a protective member.

In accordance with the above configuration (1), water or oil adhering to the electric wire or the slip-like plate spring falls down to a lowermost end position along the slip-like plate spring or the electric wire. However, since the slip-like plate spring and the electric wire are not bound at a portion to which an extremely large load is applied, the portion being to be a curved lowermost portion of the slip-like plate spring, water or oil does not adhere to a binding member nor stay thereon so that the water or oil can be discharged from the wire harness installation structure.

In addition, an extremely large load is also applied to a portion of the electric wires which is placed along the portion of the slip-like plate spring to which the extremely large load is applied. However, since the slip-like plate spring and the electric wire are not bound at the portion of the electric wires to which the extremely large load is applied, a surplus load is not applied to the electric wires so that a conductor in the electric wires is not liable to be broken.

In accordance with the above configuration (2), while a position of the movable-side protector is moved together with the movable-side structural body and the slip-like plate spring is deformed to be curved corresponding to the position, water or oil is discharged from the lowermost end of a curved position.

In accordance with the above configuration (3), since the electric wire is covered with the protection member, the electric wire does not contact a peripheral member so that the electric wire is not liable to be broken.

MODE FOR CARRYING OUT THE INVENTION

A preferable embodiment of a wire harness installation structure is described below with reference to the drawings.

Figure 1:
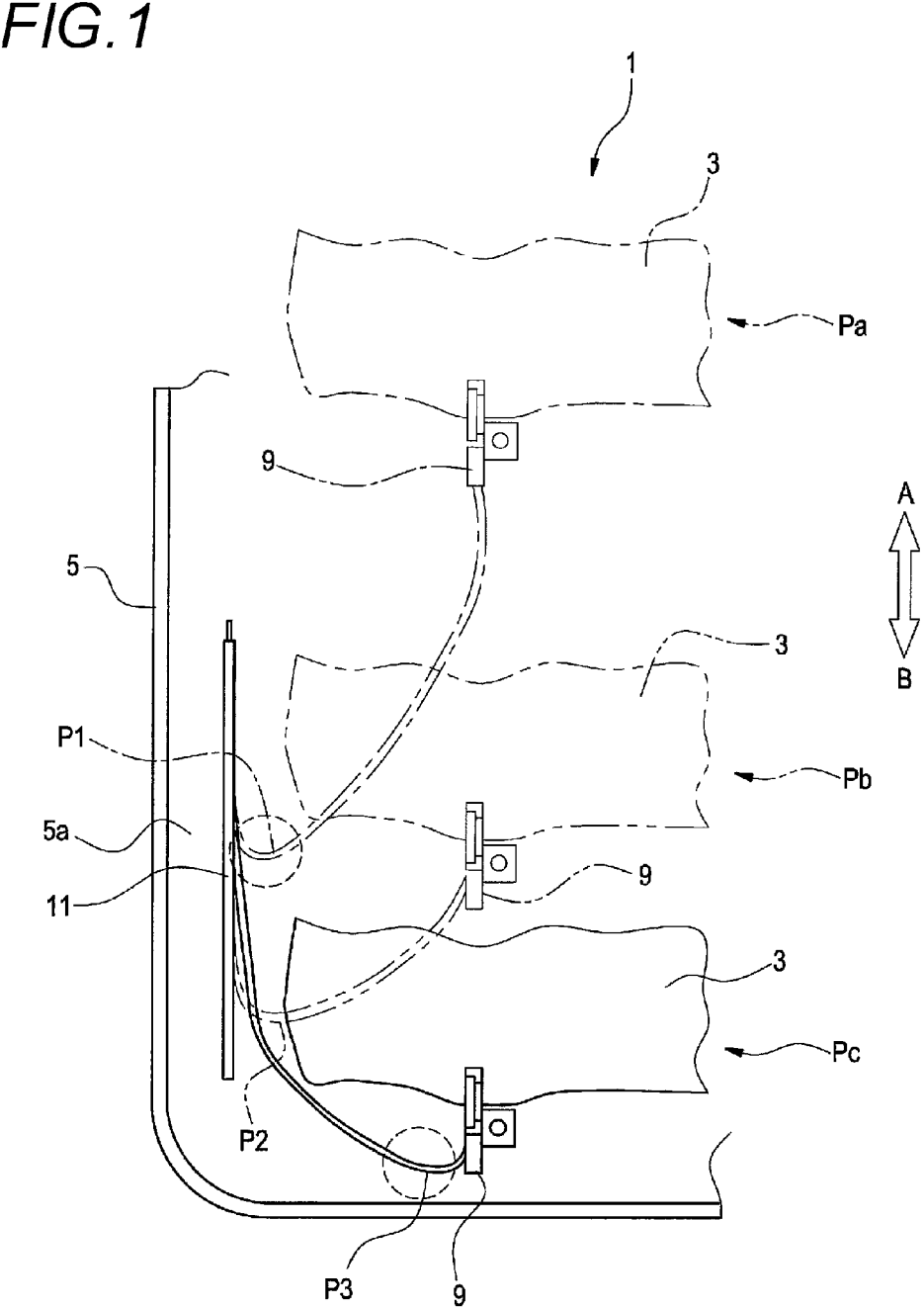
FIG. 1 is a side elevational view of a main part showing a configuration of a wire harness installation structure according to an embodiment of the invention.

A wire harness structure 1 of the embodiment is used in a case where electric power is supplied to a heating wire provided on a window glass 3 at a back door 5 of a vehicle as shown in FIG. 1.

As shown in FIG. 1, the wire harness installation structure 1 is so configured that a wire harness assembly 7 is installed so as to bridge over a door panel 5a of the back door 5 corresponding to a stationary-side structural body and the window glass 3 corresponding to a movable structural body which is movably attached to the door panel 5a.

Figure 2:
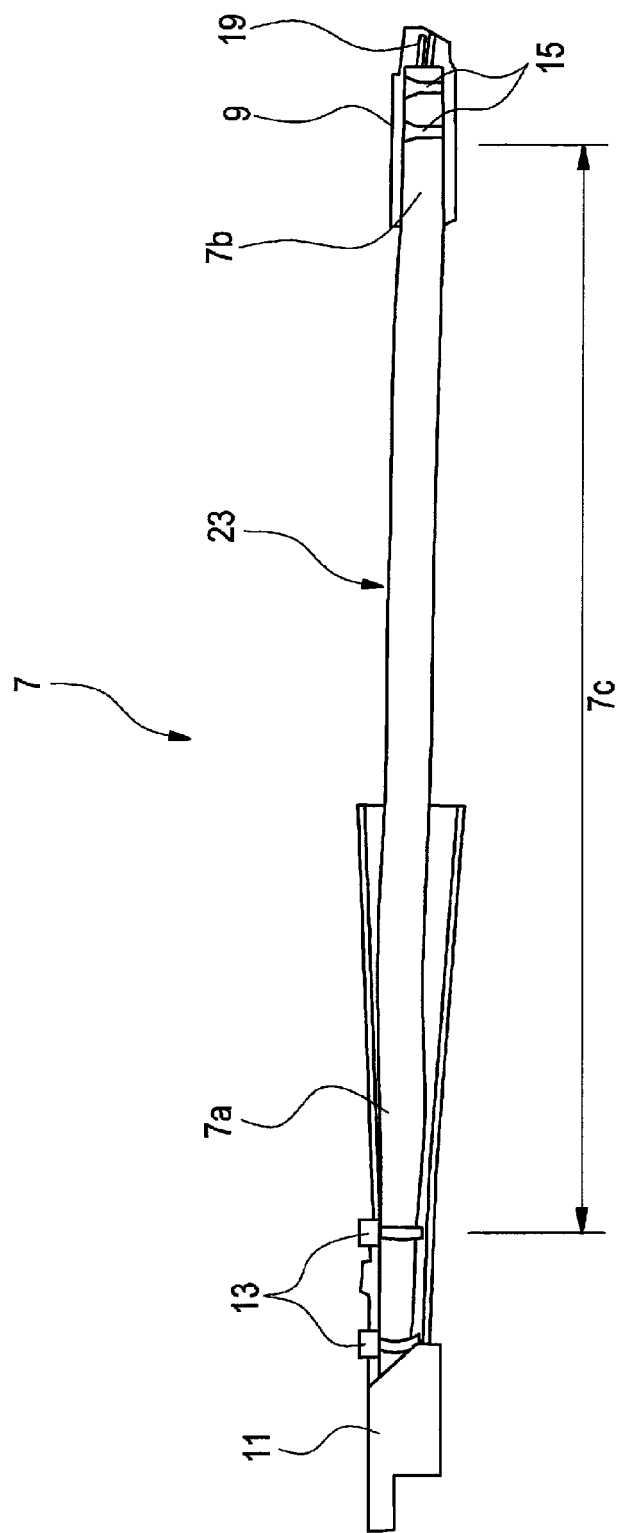
FIG. 2 is a plan view showing the configuration of the wire harness installation structure.
Figure 3:
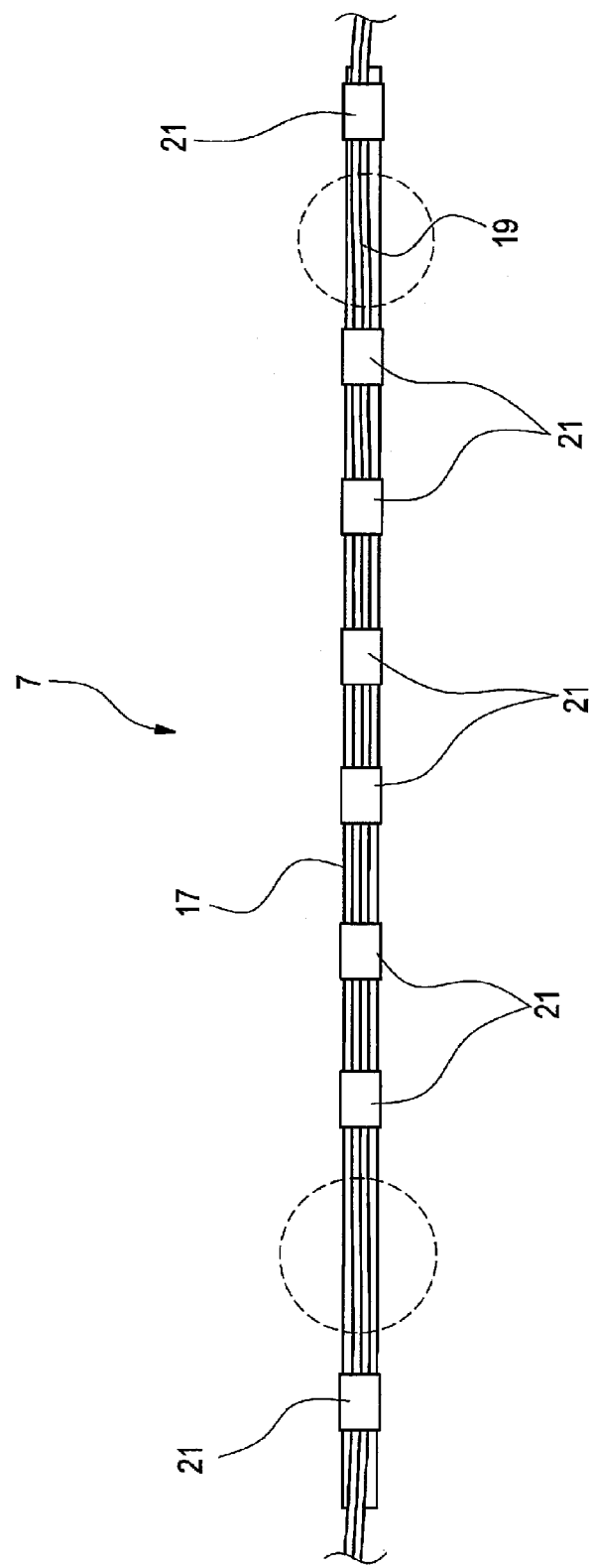
FIG. 3 is a plan view showing a binding form of a wire harness assembly.

As shown in FIGS. 2 and 3, the wire harness assembly 7 is formed such that electric wires 19 are provided along a slip-like plate spring 17 made of metal, the electric wires 19 and the plate spring 17 are bound by vinyl tapes as binding members 21 at predetermined intervals so as to be united and the whole outer periphery thereof is covered with a mesh shaped protective member 23. Therefore, as shown in FIG. 2, in a state where the wire harness assembly 7 is fastened and fixed to a stationary-side protector 11 and a movable-side protector 9, the protective member 23 of the wire harness assembly 7 is exposed at the outermost portion. Since the electric wires 19 are covered with the protective member 23, the electric wires 19 do not contact a peripheral member so that the damage can be prevented.

As shown in FIG. 2, the both ends of the wire harness assembly 7 are respectively provided with the stationary-side protector 11 and the movable-side protector 9. As shown in FIG. 1, the stationary-side protector 11 is fixed to the door panel 5a of the back door 5 as the stationary-side structural body and the movable-side protector 9 is fixed to the window glass 3 as the movable-side structural body.

Meanwhile, for example, retaining projections (not shown) are respectively provided on the stationary-side protector 11 and the movable-side protector 9 at respective predetermined positions. On the other hand, for example, retaining holes (not shown) are respectively provided at both ends of the slip-like plate spring 17. In the wire harness assembly 7 has the stationary-side protector 11 and the movable-side protector 9 as shown in FIG. 2, both ends of the slip-like plate spring 17 are respectively retained to the stationary-side protector 5 and the movable-side protector 9 and the both ends of the wire harness assembly 7 are further fastened to the stationary-side protector 11 and the movable-side protector 9, respectively.

As shown in FIG. 2, a stationary-side coupling section 7a of the wire harness assembly 7 is fastened and fixed to the stationary-side protector 11 by a binding band 13 so as not to be pulled out, and a movable-side coupling section 7b of the wire harness assembly 7 is fastened and fixed to the movable-side protector 9 by a binding band 15 so as not to be pulled out.

Each of the stationary-side protector 11 and the movable-side protector 9 is formed of a compound resin in an integral molding manner. The slip-like plate spring 17 is formed of a stainless thin plate.

The wire harness assembly 7 has a surplus length portion that allows the window glass 3 to be vertically moved and is provided at a prolongation portion 7c placed between the stationary-side coupling section 7a fixed on the stationary-side protector 11 of the door panel 5a as the stationary structural body and the movable-side coupling section 7b fixed on the window glass 3 as the movable structural body.

The window glass 3 is attached to the door panel 5a so as to be vertically moved by a lifting/lowering device (not shown) in directions indicated by arrows A and B shown in FIG. 1. In FIG. 1, a symbol Pa indicates the window glass 3 in a state that it is moved to an upper limit position, a symbol Pb indicates the window glass 3 in a half-open state that it is moved to an intermediate position, and a symbol Pc indicates the window glass 3 in a full-open state that it is moved to a lower limit position.

In association with the vertical movement of the window glass 3, a curved portion of the wire harness assembly 7 installed so as to bridge over the door panel 5a and the window glass 3 is moved as shown by symbols P1, P2 and P3.

The curved portion P1 indicates a curved state of the wire harness assembly 7 at a time when the window glass 3 is moved to the upper limit position. At that position, a curvature radius of the wire harness assembly 7 in the vicinity of the stationary-side protector 11 is the smallest and the portion having the smallest curvature radius is arranged at the lowermost end position of the wire harness assembly 7.

The curved portion P2 indicates a curved state of the wire harness assembly 7 at a time when the window glass 3 is moved to the intermediate position. At that position, a curvature radius of the wire harness assembly 7 in the vicinity of the stationary-side protector 11 is the smallest and the portion having the smallest curvature radius is arranged at the lowermost end position of the wire harness assembly 7.

The curved portion P3 indicates a curved state of the wire harness assembly 7 at a time when the window glass 3 is moved to the lower limit position. At that position, a curvature radius of the wire harness assembly 7 in the vicinity of the movable-side protector 9 is the smallest and the portion having the smallest curvature radius is arranged at the lowermost end position of the wire harness assembly 7.

Each of the curved portions P1, P2 and P3 is a portion where the curvature radius becomes the smallest when the wire harness assembly 7 is deformed and an extremely large load is applied. Each of the curved portions P1, P2 and P3 is placed at the lowermost position of the wire harness assembly 7 and is a portion which allows water or oil to be liable to stay when the water or oil is splashed thereto. Particularly, each of areas indicated by dotted lines at the curved portions P1 and P3 is a portion to which a load is mostly applied in the wire harness assembly 7.

Each of parts corresponding to the curved portions P1 and P3 in the wire harness assembly 7, is not bound by the binding member 21 as in areas shown by dotted lines in FIG. 3. That is, in the wire harness assembly 7, the electric wires 19 are bound to the slip-like plate spring 17 at portions other than a portion in the vicinity of the stationary-side protector 11 and a portion in the vicinity of the movable-side protector 9 as the portions corresponding to the curved portions P1 and P3.

As shown in FIG. 1, in a case where the window glass 3 is controlled to be vertically moved from the position Pc indicated by a solid line to the position Pb or Pa indicated by a virtual line, or from the position Pa to the position Pb or Pc, the wire harness installation structure 1 having the above configuration is adopted and electric power is supplied to the heating wire of the window glass 3 via the wire harness installation structure 1 from a power supply circuit (not shown) provided in the door panel 5a.

At that time, while the wire harness assembly 7 is bent and deformed in accordance with the position of the window glass 3 as shown in FIG. 1, a large peripheral space is attained so that the wire harness assembly 7 does not interfere the peripheral portion even when the wire harness assembly 7 is sagged. In addition, since the wire harness assembly 7 has the slip-like plate spring 17 built therein as described above, a rigidity with respect to a width direction of the wire harness assembly 7 is applied to the wire harness assembly 7 over the whole length of the wire harness assembly 7 and positional restriction of the wire harness assembly 7 can be taken by the application of the rigidity. Consequently, it is possible to eliminate troubles such as generation of an abnormal noise, a damage or the like due to contact to the door panel 5a.

During controlling of the lifting or lowering movement of the window glass 3, the curvature radius of the wire harness assembly 7 becomes small at portions in the vicinity of the stationary-side protector 11 and the movable-side connector 9 as shown by the curved portions P1 and P3 in FIG. 1. The load to the slip-like plate spring 17 becomes large as the curvature radius becomes small.

The position where the curvature radius of the wire harness assembly 7 is small and the load is large, is the lowermost end position of the wire harness assembly 7 including the slip-like plate spring 17.

Here, when assuming that water or oil is splashed to the wire harness assembly 7 in a state indicated by a virtual line in FIG. 1, the water or oil flows down to a portion in the vicinity of the stationary-side protector 11 along the slip-like plate spring 17 or the electric wires 19. However, since the curved portion P1 in the vicinity of the stationary-side protector 11 is not bound by the binding member 21 as shown in the area indicated by the dotted line in FIG. 3, the water or oil does not stay at the curved portions P1 and P3 so as to be discharged out of the wire harness assembly 7 as it is by the dropping.

On the other hand, when assuming that water or oil is splashed to the wire harness assembly 7 in a state shown by the solid line in FIG. 1, the water or oil flows down to a portion in the vicinity of the movable-side protector 9 along the slip-like plate spring 17 or the electric wires 19. However, since the curved portion P3 of the movable-side protector 9 is not bound by the binding member 21, the water or oil does not stay at the curved portions P3 so as to be discharged out of the wire harness assembly 7 as it is by the dropping.

As described above, since water or oil is smoothly discharged out of the wire harness assembly 7 even when the water or oil is splashed to the wire harness assembly 7, the water or oil does not stay at the slip-like plate spring 17 so that the wire harness assembly 7 is not liable to be corroded. Consequently, bending durability of the slip-like plate spring 17 is improved and the wire harness assembly 7 can be permanently deformed at a constant elasticity.

In addition, the areas of the curved portions P1 and P3 indicated by dotted lines are the portions to which a load is mostly applied to the electric wires 19. However, since the portions are not bound by the binding members 21, a surplus load is not applied to the electric wires 19 so that the conductor in the electric wires 19 is not liable to be broken. Consequently, the reliability of the wire harness assembly 7 is improved.

The invention is not limited to the above mentioned embodiment, but can be varied or modified if needed. The material, shape, dimension, value, style, number, installation position and the like of each of the structural components in the above embodiment can be arbitrarily determined and is not limited thereto as long as the invention can be achieved.

For example, while the vinyl tape is used as the binding member 21 in the embodiment, a binding band made of a soft resin can be used instead of that.

While the invention is described in detail by referring to a specific embodiment, it is understood by those of ordinary skill in the art that various modifications and changes can be made without departing from the spirit and scope of the invention.

This application is based on Japanese Patent Application (JP-2009-042307) filed on Feb. 25, 2009, the contents of which are incorporated herein by reference.

INDUSTRIAL APPLICABILITY

In accordance with the wire harness installation structure according to the invention, since the electric wires are bound to the plate spring by the binding members at the portions other than a portion of the plate spring to which a load is mostly applied, water or oil does not stay at a portion such as the curved lowermost portion to which an extremely large load is applied, even when the water or oil is splashed to the wire harness. Consequently, it is possible to prevent the portion applied with the extremely large load from being corroded. With this, the slip-like plate spring can stably support the electric wires for a long time period. The bending durability of the slip-like plate spring can be improved.

In addition, an extremely large load is applied to a portion of the electric wires existing along a portion of the slip-like plate spring to which an extremely large load is applied. However, since the slip-like plate spring and the electric wires are not bound to each other at a portion to which an extremely large load is not applied, a surplus load is not applied to the electric wires so that the conductor in the electric wires is not liable to be broken.

Further, since the bending durability of the slip-like plate spring can be improved, breaking of the electric wires can be prevented so that the reliability of the wire harness can be improved.

DESCRIPTION OF REFERENCE NUMERALS AND SIGNS 1 wire harness installation structure
3 window glass
5 back door
7 wire harness assembly
9 movable-side protector
11 stationary-side protector
13, 15 binding member
17 slip-like plate spring
19 electric wires
21 binding member (vinyl tape)
23 protective member

The invention claimed is:

1. A wire harness installation structure comprising:
an electric wire that has one end electrically connected to an electric component provided on a stationary structural body and the other end electrically connected to an electric component provided on a movable structural body;
a slip-like plate spring that is made of metal and has one end fixed to the stationary structural body and the other end fixed to the movable structural body; and
a binding member that is adapted to bind the electric wire to the slip-like plate spring,
wherein the electric wire is bound to the slip-like plate spring by the binding member at a portion other than a portion of the slip-like plate spring to which an extremely large load is applied when the slip-like plate spring is deformably bent in accordance with movement of the movable structural body, and
as a result of the slip-like plate spring being deformably bent in a state such that when the movable structural body is located in a first limit position and in a second limit position, the portion of the slip-like plate spring to which the extremely large load is applied is at a lower most end position having a smallest curvature radius,
wherein the first limit position is a position in which the movable structural body is in a fully-closed state, and the second limit position is a position in which the movable structural body is in a fully-open state.

2. The wire harness installation structure according to claim 1, further comprising:
a stationary-side protector to which one ends of the bound slip-like plate spring and the electric wire bound to each other are fixed, and the stationary-side protector being fixed to the stationary-side structural body; and
a movable-side protector to which the other ends of the slip-like plate spring and the electric wire bound to each other are fixed, and the movable-side protector being fixed to the movable-side structural body.

3. The wire harness installation structure according to claim 1, wherein the slip-like plate spring and the electric wire bound to each other are covered with a protective member.

4. The wire harness installation structure according to claim 2, wherein the slip-like plate spring and the electric wire bound to each other are covered with a protective member.

5. The wire harness installation structure according to claim 1, wherein the slip-like plate spring is configured to receive the extremely large load at the portion other than the portion of the slip-like plate spring as a result of the movement of the slip-like plate spring.

6. The wire harness installation structure according to claim 1, wherein the slip-like plate spring is configured to move in the vertical direction along with the moveable structural body.

* * * * *